United States Patent

[11] 3,598,432

[72] Inventor Melvin F. Walker
 Dix Hills, N.Y.
[21] Appl. No. 867,765
[22] Filed Oct. 20, 1969
[45] Patented Aug. 10, 1971
[73] Assignee Designatronics, Inc.
 Mineola, N.Y.

[54] HUB CLAMP
 4 Claims, 7 Drawing Figs.
[52] U.S. Cl. .................................... 287/52.04,
  287/52.08, 287/111
[51] Int. Cl. ..................................... F16d 1/06
[50] Field of Search .......................... 287/52.03,
  52.04, 52.08, 52.09, 110, 114, 53 H, 111

[56] References Cited
 UNITED STATES PATENTS
 286,340 10/1883 Spaulding .................... 287/52.09

| 1,220,185 | 3/1917 | Cathcart | 287/52.09 |
| 2,564,019 | 8/1951 | Martin, Jr. | 287/110 X |
| 2,620,675 | 12/1952 | Meadows et al. | 287/52.08 |
| 2,754,716 | 7/1956 | Bourns | 85/8.3 |
| 3,107,523 | 10/1963 | Oliver, Jr. et al. | 279/44 |

FOREIGN PATENTS

| 173,416 | 1/1922 | Great Britain | 287/52.04 |

Primary Examiner—David J. Williamowsky
Assistant Examiner—Andrew V. Kundrat
Attorney—Leonard H. King ABSTRACT: A bushing, having a deflectable tab provided with a flatted portion on the outside surface thereof, is inserted in the bore of a rotatable hub and is brought into gripping engagement with a shaft by means of a setscrew which extends through the hub and which bears against the flatted portion of the deflectable tab.

PATENTED AUG 10 1971 3,598,432

INVENTOR
MELVIN F. WALKER
BY
Leonard H. King
ATTORNEY

HUB CLAMP

This invention relates generally to miniature, precision mechanical components and in particular to improved means for securing the hub of such a component to a shaft for rotation therewith.

BACKGROUND OF THE INVENTION

Miniature, precision mechanical components, for example the gears and the gear assemblies that are used in mechanical computers, present several assembly problems not found in the larger, more conventional gears. As the name implies, miniature gears usually provide very little material to work with, the space available for mounting and adjustment is usually very limited and yet, because of the critical nature of the application, the miniature gears must be very accurately positioned without likelihood of movement after the proper angular or axial adjustment has been made. Some attempts to solve the mounting problem of miniature precision gears have resulted in the use of drive or locking pins to fasten the gear hub to its shaft and in the use of clamp members to deflect a slotted gear hub into frictional engagement with its shafts. There are sufficient disadvantages to both these prior art structures to encourage those working in the art to seek more practical solutions.

One novel approach to the construction of clampable, precision gears is described in U.S. Pat. No. 3,139,296, issued on June 30, 1964 to Sanford I. Greene. This patent describes a gear, clampable on a supporting shaft in any desired angular position, as comprising a gear body and a cylindrical collar integral therewith, a continuous bore extending through the body and the collar, two longitudinally spaced transverse radial slots through a substantial portion of the collar, one slot adjacent the gear body, a longitudinal slot through at least one portion of the collar and lying in a plane substantially axial thereof, the longitudinal slot extending between and intersecting the radial slots, and a clamping screw passing through a portion of the collar on one side of the longitudinal slot and threaded into a portion of the collar on the opposite sides of the longitudinal slot.

The structure described above and in the aforementioned patent is well suited to miniature, precision gears. However, it does exhibit several very important disadvantages that limit its practicality. For example, the longitudinal slot cannot readily be made by ordinary machining techniques. The longitudinal slot must be made by electrical discharge machining or other similarly advanced means and therefore requires highly skilled labor as well as relatively costly equipment. As a result of the machining, and particularly at the close tolerances that are mandatory in this art, the slots will necessarily have burrs protruding into the inside diameter of the hub and these can be removed only by costly and slow hand deburring.

It is also important to note that, in the aforementioned patent, the slots define flexible tabs and that the line of action of the screw with respect to the tabs is such that the tightening of the screw causes a change of curvature of the tabs. This in turn causes bending stresses that resist turning of the screw. Further, because of the very small sizes involved, a compromise must be made as to the flexibility of the tabs and the size of the screw. Even with the best balance possible of these two factors the screws that are generally used are fine threaded and can easily be stripped by using excessive force.

Another example of the prior art that is not described in the patent literature but which is presently available commercially provides a hub or collar that may be applied to a gear and which includes an axially extending, arcuate cut. The arcuate cut extends partially about the bore of the collar and a substantially radial cut extends from the bore and terminates at the arcuate cut to define a flexible, integral tab. A set screw extending radially into the hub bears against the tab to deflect it inwardly into gripping engagement with the shaft positioned in the bore.

As with the patented structure that was described previously, the arcuate slot is difficult and expensive to make and must be done by nonconventional means, such as electrical discharge means or the like. It is apparent that if cutting saws are used they would have to have very small diameters or, alternatively, the quantity of material removed relative to the hub diameter would have to be large. Of even greater importance is the fact that the machining of the slot causes an out-of-roundness of the bore. Therefore the concentricity of the gear teeth with respect to the shaft mounted in the bore would not meet precision gear standards.

U.S. Pat. Nos. 2,827,316 and 2,986,416 are also pertinent to a discussion of prior art in that they both disclose separate, internal members that act to secure a hub to a shaft. U.S. Pat. No. 2,827,316, issued on Mar. 18, 1958 to William W. Duffy, discloses an arcuate, insert member having a length of approximately 90°. One end of the arcuate member has a circular rib that fits in a similarly shaped recess in the hub while the opposite end has a radial extension that can be inwardly deflected by a setscrew so that the central portion of the insert member can bear against and retain a shaft. This structure does not provide full circumferential clamping and in addition, is costly because of the complex shape of the insert and the recess in the hub to contain the insert. In addition, means must be provided to prevent axial movement of the insert. Therefore, its utility in miniature precision gearing is severely limited.

U.S. Pat. No. 2,986,416, granted on May 30, 1961 to David Firth teaches the use of an annular, wedgelike bushing that acts like a taper lock when a force is applied by axially located setscrews. The size of the structure plus the axial positioning and action of the setscrews makes the device totally inapplicable to miniature, precision gearing installations.

In contrast to the prior art the present invention provides clamping means that are particularly well suited to miniature precision gears or the like and which can be manufactured with conventional machinery. By way of example, the present invention is comprised of a gear having an integral hub that includes a bore concentric with the pitch diameter of the gear. A bushing is press fit into the bore and is secured therein. The bushing has two slots machined therein by conventional techniques, one slot being parallel and one slot being perpendicular to the longitudinal axis of the bushing. The slots, in combination, define an integral, deflectable tab that frictionally secures the bushing to the shaft when a setscrew is threaded through the hub and against a flatted portion of the tab. An annular groove formed on the inside diameter can be added to remove any burrs formed by the cutting of the slots. Further, the hub can be counterbored and the bushing made somewhat shorter than the hub to assure concentricity between the gear pitch diameter and the longitudinal axis of the shaft.

The foregoing description, while applicable to the present invention, is, for the most part, readable on the invention disclosed in a copending application filed by Frank Buchsbaum on July 12, 1968, Ser. No. 744,567, and now Pat. No. 3,507,508, which copending application is assigned to the assignee of the instant invention. What distinguishes the present invention from that disclosed and claimed in the copending application is the use of the flatted portion on the deflectable tab. The setscrew bears against the deflectable tab either at an angle or perpendicular to the plane of the flatted portion. The setscrew may be positioned on a centerline coincidental with a diametric axis of the bushing or it may be laterally offset with respect thereto. In both of the last two mentioned embodiments, the axis of the setscrew is perpendicular to the plane of the flatted portion which is a chordal line with respect to the circumference of the bushing.

It has been unexpectedly found that, by providing a flatted portion as a bearing surface for the inner end of the setscrew, a substantially greater torque can be transmitted to a setscrew of a given size.

While the subsequent description will relate to the mounting means for a miniature precision gear, it should be clearly understood that the scope of the present invention is not limited thereto and includes any shaft-mounted rotating components such as wheels, gears, pulleys, sprockets, ratchets, rollers, cams, dials, couplings, etc., and that the above terms are used interchangeably in their generic sense.

Accordingly, it is a primary object of this invention to provide improved means for securing a shaft-mounted wheel.

A particular object of this invention is to provide improved means for securing a shaft-mounted wheel in the miniature, precision class.

Another object of this invention is to provide a bushing having an integral, deflectable tab for securing a gear hub to a shaft.

An additional object of this invention is to provide a bushing, as described directly above, that can be fabricated by conventional techniques.

An important object of this invention, as described above, is to provide a flatted bearing surface on the outside of the deflectable tab against which surface the inner end of the setscrew is positioned.

Another important object of this invention, as described above, is to orient the axis of the setscrew perpendicular to the plane of the flatted bearing surface.

A further object of this invention, as described above, is to orient the axis of the setscrew at an angle to the plane of the flatted bearing surface.

Still another object of this invention, as described above, is to provide a plurality of setscrews the axes of which are at different angles with respect to the flatted bearing surface.

An additional object of this invention, as described above, is to position the axis of the setscrew coincidentally with a diametric axis of the bushing and perpendicular to the plane of the flatted bearing surface.

Yet another object of this invention, as described above, is to laterally offset the axis of the setscrew from a diametric axis of the bushing, the axis of the setscrew being perpendicular to the plane of the flatted bearing surface.

These and other features, objects and advantages of the invention will, in part, be pointed out with particularity and will, in part, become obvious from the following more detailed description of the invention taken in conjunction with the accompanying drawing which forms an integral part thereof.

DESCRIPTION OF THE PREFERRED EMBODIMENT

Figure 1:
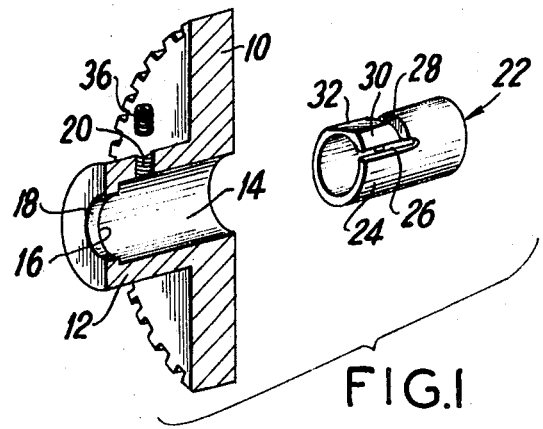
FIG. 1 is an exploded, perspective view, partly in section, illustrating the gear, the hub, and the bushing of this invention.
Figure 2:
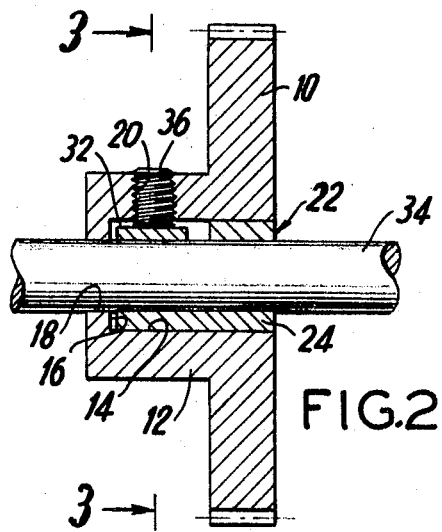
FIG. 2 is a sectional side elevational view illustrating the components of FIG. 1 assembled with a shaft and setscrew.
Figure 3:
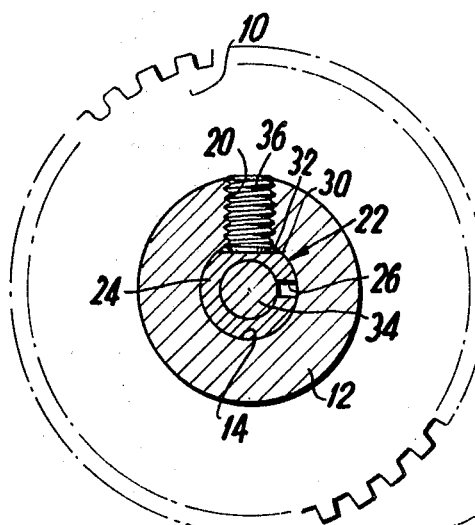
FIG. 3 is a transverse, sectional elevational view taken along line 3-3 of FIG. 2.

The present invention, as shown in FIG. 1, FIG. 2 and FIG. 3, comprises a gear 10 having an integral and longitudinally extending hub 12. A longitudinal bore 14 is provided in the hub 12 and includes a shoulder 16 extending radially inward at the end of the hub 12 opposite the gear 10. The shoulder 16 defines an accurately located and machined bore 18 that permits the gear teeth to be generated concentrically thereto.

Finally, the hub 12 is provided with at least one tapped hole 20 that, in this particular embodiment, extends radially through the wall of the hub 12.

FIGS. 1 and 3 particularly illustrate the bushing 22 that comprises this invention. The bushing 22 is tubular, the wall portion 24 thereof having a first slot 26 that is parallel to the longitudinal axis of the bushing and a second slot 28 that is perpendicular or transverse to the longitudinal axis of the bushing 22. It will be seen, particularly in FIG. 1, that the bushing slots 26 and 28 intersect to define a tab 30 that has a flatted portion 32 formed on the outside surface thereof. The tab 30 will be flexible to a degree dependent upon the composition of the bushing material and the thickness of the wall portion 24.

FIG. 3 illustrates one embodiment of the present invention in the assembled condition. A shaft 34 is inserted into the inside diameter of the bushing 22 and is secured thereto by means of a setscrew 36. When the setscrew 36 is tightened or moved radially inward it will cause the flexible tab 30 to clamp the hub 12 against the shaft 34. The gear 10 and hub 12 can be axially located anywhere on the shaft 34 and can also be set at any desired angular position. It should also be noted that the bushing 22 is axially shorter than the bore 14 and is slightly spaced from the shoulder 16. This is to provide solid support in the area of the tab 30. Further, the shaft 34 is mounted concentrically with the gear 10 by means of shoulder 16 and bore 18 and is also supported by the solid or uncut part of the body portion 24 of the bushing 22.

In its more basic form, the present invention provides superior torque-transmitting capabilities by reason of the flatted portion 32 that is provided on the outside surface of the bushing 22 in the area of the deflectable tab 30. With the setscrew 36 positioned radially, that is, with its longitudinal axis substantially perpendicular to the plane of the flatted portion 32 it was possible to exert an average torque of 14 inch ounces using a hub having an 0.0902 inch bore diameter. This torque capacity is superior to that permitted by presently available components of a comparable size. Obviously, the torque capacity could be increased by using larger screws but this would of course defeat the purpose of miniaturizing the components.

The torque is first produced by compressively loading a portion of the tab 30 in a radial direction against the shaft 34 in much the same manner as a drum brake. A second torque-producing mode is achieved by wrapping action that creates a tension load in the remaining section of the tab 30 which thus acts as a band brake.

The data given in the following table is the average of tests performed on production samples. The shaft material was 303 stainless steel and was 0.0003 inches to 0.0005 inches under the nominal size. The hardened alloy, steel, socket head, cup point setscrews 36 were tightened with a torque wrench to the values indicated.

| Bore size in inches | Screw size | Recommended screw seating torque (max.) oz. in. | Avg. torque (oz. in.) that can be transmitted at various percent of rec. screw seating torque | | |
| --- | --- | --- | --- | --- | --- |
| | | | 60 percent | 80 percent | 100 percent |
| 0.0900 | 2-56 | 24 | 35 | 46 | 58 |
| 0.0937 | 2-56 | 24 | 35 | 46 | 58 |
| 0.1200 | 2-56 | 24 | 49 | 65 | 83 |
| 0.1248 | 2-56 | 24 | 49 | 65 | 83 |
| 0.1873 | 4-40 | 69 | 104 | 138 | 176 |
| 0.2405 | 6-32 | 160 | 280 | 376 | 448 |
| 0.2498 | 6-32 | 160 | 280 | 376 | 448 |

Figure 5:
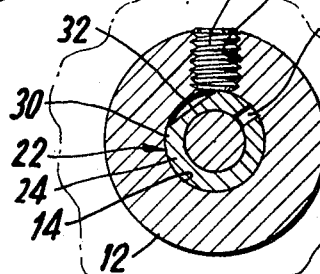
FIG. 5 is a transverse, sectional, elevational view, similar to FIG. 3 illustrating an additional, alternative embodiment of this invention.

In FIG. 5 there is shown another alternative embodiment of this invention. It will be particularly noted that the setscrew 36 is radially located, that is, not offset with respect to a centerline of the hub 12. However, in this embodiment the bushing is rotated such that the flatted portion 32 is at an angle to the longitudinal axis of the setscrew 36. Test data indicates that with an 0.0902 inch diameter hub bore, a torque capacity of 45 inch ounces is achieved. This result was unexpected and is believed to be provided by a wedging or camming action resulting from the nonperpendicularity of the flatted portion 32 with respect to the longitudinal axis of the setscrew 36.

Figure 4:
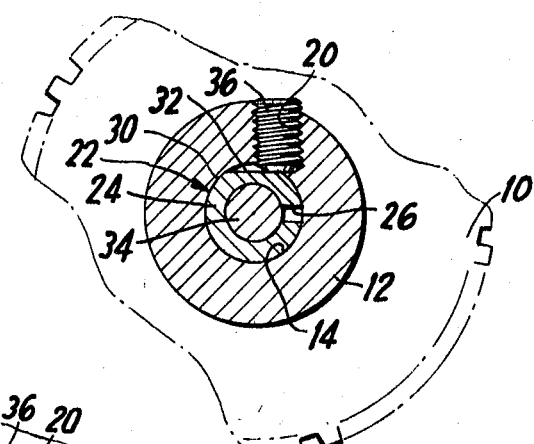
FIG. 4 is a transverse, sectional, elevational view, similar to FIG. 3, illustrating an alternative embodiment of this invention.
Figure 6:
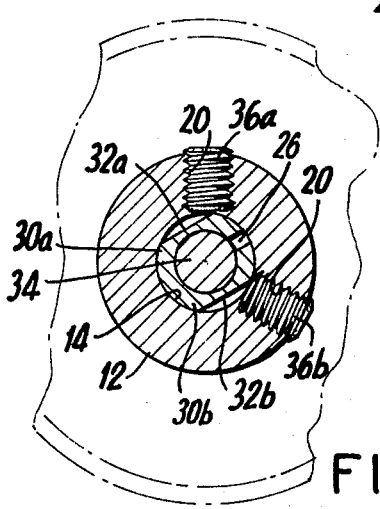
FIG. 6 is a transverse, sectional, elevational view, similar to FIG. 3, illustrating still another, alternative embodiment of this invention.

Turning now to FIG. 6, there is shown a modification of the embodiment illustrated in FIG. 5. Two setscrews 36a and 36b are used in the FIG. 6 embodiment with the longitudinal axes of both setscrews being oriented radially with respect to the axis of the hub 12a. In this embodiment, two diametrically opposed flats 32a and 32b are provided on the bushing 22a. One flatted portion 32a is provided on the deflectable tab 30a, the other flatted portion 32b being substantially parallel thereto and angularly spaced 180° therefrom. It is expected that approximately twice the torque capacity can be achieved by the construction shown in FIG. 6 over that shown in FIG. 5. It should also be noted that either of the screws 36a or 36b, or both said screws, could be positioned with its longitudinal axis perpendicular to the plane of its respective flatted portion, as shown in either FIG. 3 or FIG. 4. Further, one screw could be nonradially positioned and the other one radially positioned, or both screws could be nonradially positioned in addition to the arrangement shown in FIG. 6.

Figure 7:
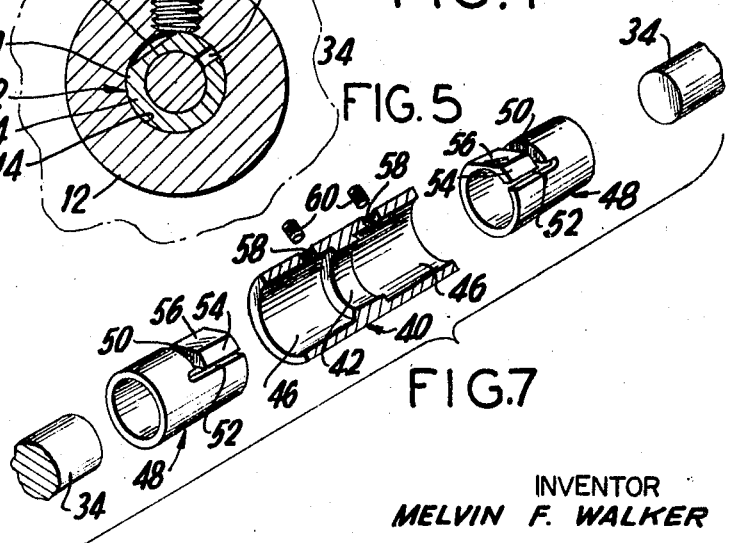
FIG. 7 is an exploded, perspective view, partly in section, of a further, alternative embodiment of this invention.

As mentioned previously, the scope of the present invention includes many different forms of shaft-mounted rotatable components. For example, the structure shown in FIG. 7 provides means for coupling two coaxial, in-line shafts for miniature precision applications. There is provided a double-ended hub 40 having a smaller, longitudinally centered bore 42 to receive and align the ends of opposed shafts 44. Coaxial bores 46 in the double-ended hub 40 are each dimensioned to receive a tubular bushing 48 of the type described in connection with the previous embodiments. One end of each bushing 48 is formed with a first transverse slot 50 and a second, intersecting, axially positioned slot 52 the combination of which defines a deflectable tab 54 that is provided with a flatted portion 56. One or more tapped holes 58 are formed in the wall of the hub 40 to receive a setscrew 60. As in any of the previous embodiments, the setscrew 60 bears against the flatted portion 56 either perpendicular or at an angle to the plane thereof.

It will be appreciated that the invention described hereinbefore provides a distinct and unexpected advantage over the prior art as well as the copending application previously mentioned. The torque capacity of the fastening means used in a miniature precision rotating assembly is substantially increased by provision of the flatted portion on the deflectable tab of the bushing. Various degrees of torque capacity are achieved by the orientation of the screw axis relative to the flatted portion. The screw can either by radial or offset and the flatted portion can either by perpendicular or at an angle to the screw axis. One or more screws in combination with a like number of flatted portions can be used with any of the above arrangements.

The present invention is clearly distinguished over that segment of the prior art wherein relatively large gearing or the like is used and particularly where a low level of concentricity tolerances are involved. As mentioned above, the present invention is directed exclusively to the miniature precision art. Accordingly, the present invention is not anticipated by sheet metal type structure wherein parts are bolted together and wherein a slotted clamping band is urged inwardly by a generally radially extending bolt. Such prior art construction does not require close tolerance work nor is concentricity between the rotating member and the shaft of any particular importance. British Pat. No. 173,416 is typical of the prior art just described and is generally characterized by a sheet metal steel band that is longitudinally split throughout its entire length so that the band may be inwardly deflected by the bolt. The structure in the British patent, because of its size and loose tolerance standard, requires the use of an additional screw to prevent rotation of the slit band. It will be appreciated that with the present invention only a very small tab that represents only a small portion of one end of the bushing is inwardly deflected. Even though the British patent does show a flatted portion on the sleeve and a nonradially disposed bolt there is no anticipation thereby of the present invention because the bolt does not act on a small axial length of the sleeve. The British patent does not suggest that sufficient clamping action can be achieved by very small, very fine threaded fasteners if only a portion of the slotted sleeve is used for clamping.

Having thus disclosed the best embodiment of the invention presently contemplated, it is to be understood that various changes and modifications may be made by those skilled in the art without departing from the spirit of the invention.

I claim:

1. In clamping means suitable for mounting on a rotatable shaft and of the type consisting of an elongated tubular hub having a bore therethrough, at least one tubular bushing positioned in the bore of the hub, the bushing including a deflectable tab defined by intersecting longitudinal and transverse slots in the wall thereof, the improvement comprising the combination of one screw disposed in the hub wall and one flattened portion formed on the deflectable tab, the plane of said flattened portion being substantially perpendicular to the longitudinal axis of said screw which is radially disposed in the hub and wherein there is another flattened portion diametrically opposite and substantially parallel to said first flatted portion, there being further included two of said screws the longitudinal axes of which intersect the planes of said flatted portions.

2. The improvement in accordance with claim 1 wherein the plane of said flatted portions is at an angle to the longitudinal axes of said screws.

3. The improvement in accordance with claim 2 wherein the longitudinal axis of each of said screws is radially disposed in the hub.

4. The improvement in accordance with claim 2 wherein the longitudinal axis of one of said screws is radially disposed in the hub and the longitudinal axis of the other of said screws is nonradially disposed in the hub.